US012407203B2

(12) United States Patent
Botiov et al.

(10) Patent No.: US 12,407,203 B2
(45) Date of Patent: Sep. 2, 2025

(54) ELECTRIC MOTOR HAVING A ROTOR WITH A BURST-PROTECTION SLEEVE WITHOUT AN ADHESION OF THE MAGNET ELEMENTS

(71) Applicant: Schaeffler Technologies AG & Co. KG, Herzogenaurach (DE)

(72) Inventors: Julian Botiov, Bühl (DE); Markus Dietrich, Oberkirch (DE); Christian Brunner, Rheinstetten (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 144 days.

(21) Appl. No.: 17/791,212

(22) PCT Filed: Oct. 21, 2020

(86) PCT No.: PCT/DE2020/100906
§ 371 (c)(1),
(2) Date: Jul. 7, 2022

(87) PCT Pub. No.: WO2021/139848
PCT Pub. Date: Jul. 15, 2021

(65) Prior Publication Data
US 2023/0065959 A1 Mar. 2, 2023

(30) Foreign Application Priority Data
Jan. 9, 2020 (DE) ............. 10 2020 100 306.4

(51) Int. Cl.
*H02K 1/2781* (2022.01)
*H02K 1/28* (2006.01)
*H02K 21/14* (2006.01)

(52) U.S. Cl.
CPC ............. *H02K 1/2781* (2022.01); *H02K 1/28* (2013.01); *H02K 21/14* (2013.01)

(58) Field of Classification Search
CPC ........ H02K 1/2781; H02K 1/278; H02K 1/28; H02K 21/14
(Continued)

(56) References Cited

U.S. PATENT DOCUMENTS 4,855,630 A * 8/1989 Cole ...................... H02K 1/278
310/156.28
2009/0195102 A1* 8/2009 Shibui .................. H02K 1/2733
310/156.28
(Continued)

FOREIGN PATENT DOCUMENTS

DE 102008012628 A1 4/2009
DE 102018108595 A1 10/2019
(Continued)

*Primary Examiner* — Michael Andrews
(74) *Attorney, Agent, or Firm* — Suiter Swantz IP (57) ABSTRACT

An electric motor having a stator and a rotor rotatably mounted about a rotational axis relative to the stator is disclosed. The rotor additionally has a main part, multiple magnet elements which are distributed along the circumferential direction and are received on a radial face of the main part in a mutually spaced manner, and a burst-protection sleeve which covers the main part and the magnet elements. The burst-protection sleeve has multiple cover segments, each of which directly contacts a magnet element, and multiple bridging regions which connect two adjacent cover segments together, wherein the burst-protection sleeve is used to directly support the magnet elements relative to the main part, and the bridging regions have a lower degree of flexural strength in the circumferential direction than the cover segments.

9 Claims, 7 Drawing Sheets

(58) Field of Classification Search
USPC .......................... 310/156.28, 156.29, 156.31
See application file for complete search history.

(56) References Cited

U.S. PATENT DOCUMENTS

| 2012/0001510 | A1* | 1/2012 | Uni ........................ | H02K 1/278 |
| | | | | 310/156.28 |
| 2017/0141628 | A1* | 5/2017 | Nose ...................... | H02K 5/161 |
| 2017/0207672 | A1* | 7/2017 | Davis ..................... | H02K 1/278 |

FOREIGN PATENT DOCUMENTS

| JP | S6323543 | A | 1/1988 |
| JP | 2004343817 | A | 12/2004 |
| JP | 2009171736 | A | 7/2009 |
| JP | 2012016236 | A | 1/2012 |
| JP | 2015100202 | A | 5/2015 |
| JP | 2018074654 | A | 5/2018 |
| KR | 1020070023076 | A | 2/2007 |

* cited by examiner

ELECTRIC MOTOR HAVING A ROTOR WITH A BURST-PROTECTION SLEEVE WITHOUT AN ADHESION OF THE MAGNET ELEMENTS

CROSS-REFERENCE TO RELATED APPLICATIONS

This application is the U.S. National Phase of PCT Appln. No. PCT/DE2020/100906 filed Oct. 21, 2020, which claims priority to DE 102020100306.4 filed Jan. 9, 2020, the entire disclosures of which are incorporated by reference herein.

TECHNICAL FIELD

The disclosure relates to an electric motor, which is preferably used in an actuator of an actuating device of a motor vehicle, having a stator and a rotor rotatably mounted about a rotational axis relative to the stator, wherein the rotor additionally has a main part, multiple magnet elements which are distributed along the circumferential direction and are received on a radial face of the main part in a mutually spaced manner, and a burst-protection sleeve which covers the main part and the magnet elements, and wherein the burst-protection sleeve has multiple cover segments, each of which directly contacts a magnet element and multiple bridging regions which connect two adjacent cover segments together.

BACKGROUND

Generic electric motors are already sufficiently known in the prior art. Accordingly, DE 10 2018 108 595 A1, for example, discloses a motor with a burst-protection sleeve with magnetic and less magnetic sections. Thus, it is already known to equip rotors of electric motors with burst-protection sleeves, which ensure that components loosening during operation of the electric motor do not immediately cause damage to other components of the electric motor.

However, one disadvantage of these designs known from the prior art is that their manufacturing effort is relatively high. This is because a bonding connection is usually used to fix the magnet elements firmly to the main part of the rotor. However, the manufacturing cost of these bonded rotors is relatively high. Also, the resulting disadvantages for the magnetic resistance in the magnetic circuit between the stator and the rotor are relatively high due to the provision of these bonded connections.

SUMMARY

It is therefore the object of the present disclosure to eliminate the disadvantages known from the prior art and, in particular, to provide an electric motor which can be manufactured and assembled with a reduced effort and which offers the highest possible efficiency.

According to the disclosure, this is achieved by using the burst-protection sleeve directly to support the magnet elements relative to the main part, wherein the bridging regions have a lower degree of flexural strength in the circumferential direction than the cover segments.

Via the bridging regions, less rigid regions are deliberately introduced into the burst-protection sleeve compared with the cover segments, with the result that the burst-protection sleeve can be expanded to a certain extent throughout. This makes the assembly of the burst-protection sleeve much easier and, in the case of a high overlap in the press fit to the rotor magnets, makes it possible at all. Compared to designs according to the prior art, the assembly effort is significantly reduced by eliminating the need for a previously used adhesive bond.

Further embodiments according to the disclosure are claimed and explained in more detail below.

Accordingly, it is further advantageous if the burst-protection sleeve is fixed via a press fit on the magnet elements attached to the main part/on the pre-assembly formed by the main part and magnet elements. This ensures that the burst-protection sleeve is fastened as robustly as possible.

If the respective bridging region has a groove-shaped depression, the bridging region has a shape that is as easy to manufacture as possible. The groove-shaped depression is preferably formed by bending or deep-drawing.

If the respective bridging region is open towards one axial end or towards both axial ends of the burst-protection sleeve, it exhibits a flexural strength that is as constant as possible along its length, which further reduces the assembly effort.

If the burst-protection sleeve has a diameter change, preferably an increase in diameter, at one axial end, an assembly aid for the burst-protection sleeve is provided in a simple manner. This is because such a diameter change allows the burst-protection sleeve to be slid onto or into the pre-assembly consisting of the main part and magnet elements and to be guided during the initial phase of the assembly process.

In this context, it is also useful if, at the axial end of the burst-protection sleeve, each cover segment has an extension projecting obliquely in the axial direction, forming the diameter change.

In this regard, it is also useful if each bridging region is provided with a rising flank towards the axial end of the burst-protection sleeve, forming the diameter change.

In other words, the diameter change is therefore preferably formed by a conically widening or tapering annular rim. This results in an insertion aid that is as easy to manufacture as possible for inserting the assembly consisting of the main part and magnet elements into the burst-protection sleeve. This annular rim is preferably formed directly during the forming of the burst-protection sleeve, preferably by punching or deep-drawing.

The rotor is further arranged relative to the stator in such a way that the extensions are arranged axially adjacent to the magnet elements. As a result, the performance of the electric motor is not adversely affected by the provision of the annular rim.

Furthermore, it has proven advantageous if the electric motor is designed as a brushless DC motor.

In other words, the disclosure provides an improved version of a BLDC rotor with surface magnets (magnet elements) and a burst-protection sleeve in terms of manufacturability and mountability without the need for any adhesive bonding of the magnets.

BRIEF DESCRIPTION OF THE DRAWINGS

In the following, the disclosure is now explained in more detail with reference to figures.

In the figures.

DETAILED DESCRIPTION

The figures are only schematic in nature and serve only for understanding the disclosure. The same elements are provided with the same reference symbols.

Figure 1:
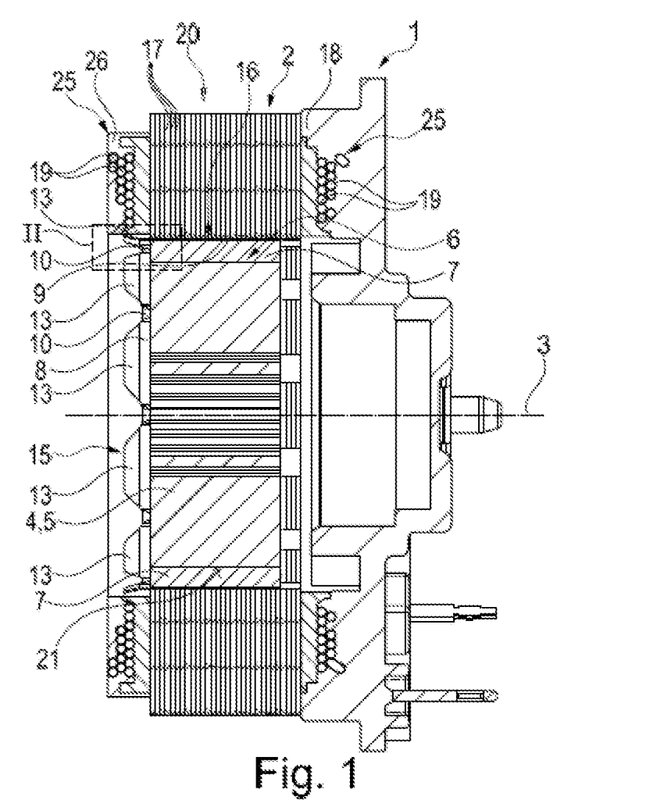
FIG. 1 shows a longitudinal sectional view of an electric motor according to a preferred exemplary embodiment of the disclosure, wherein the overall structure of the electric motor can be clearly seen.
Figure 3:
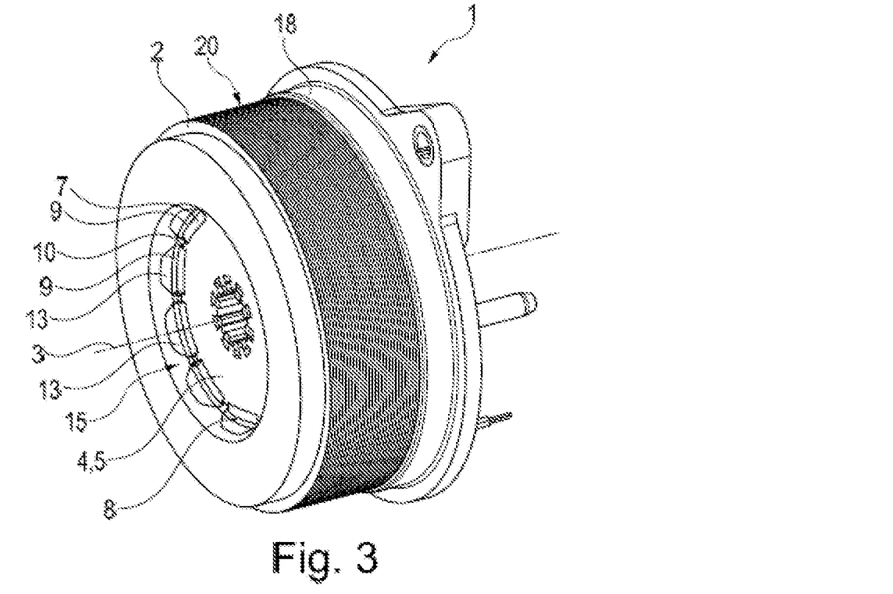
FIG. 3 shows a perspective view of the electric motor according to FIG. 1.
Figure 4:
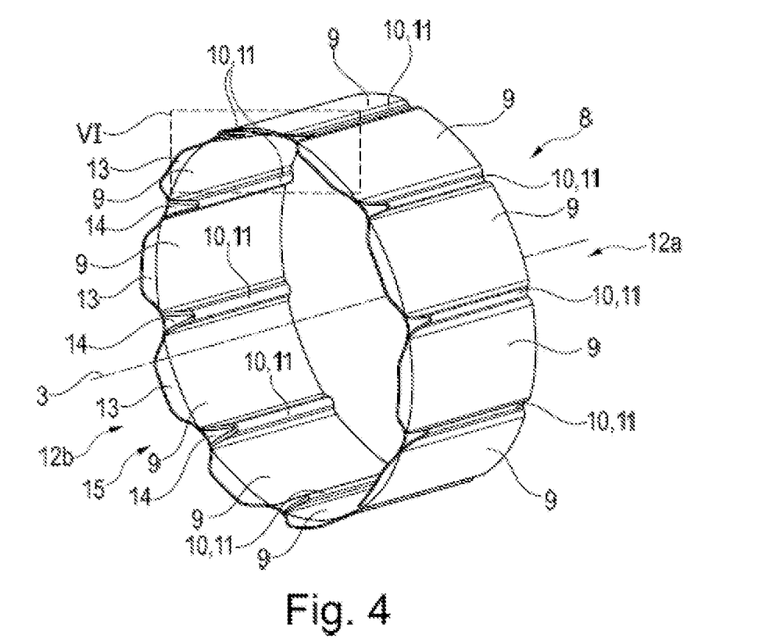
FIG. 4 shows a perspective view of the burst-protection sleeve used in FIGS. 1 to 3 from a front side.
Figure 5:
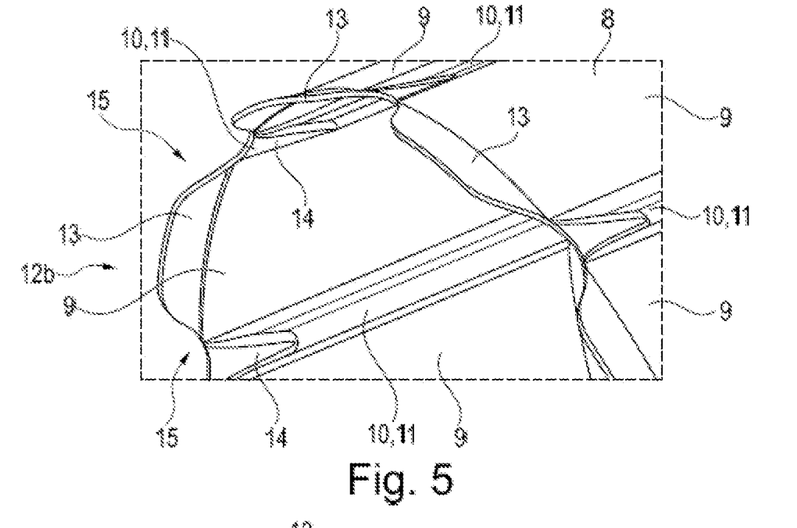
FIG. 5 shows a detailed view of the region marked "V" in FIG. 4 to illustrate an expanding annular rim of the burst-protection sleeve.
Figure 6:
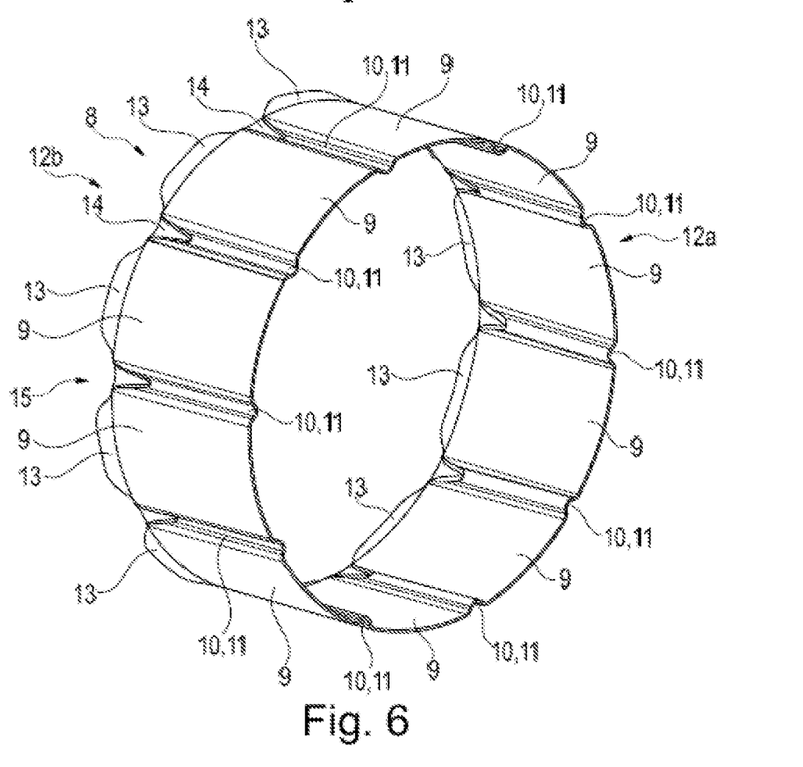
FIG. 6 shows a perspective view of the burst-protection sleeve from a rear side.
Figure 12:
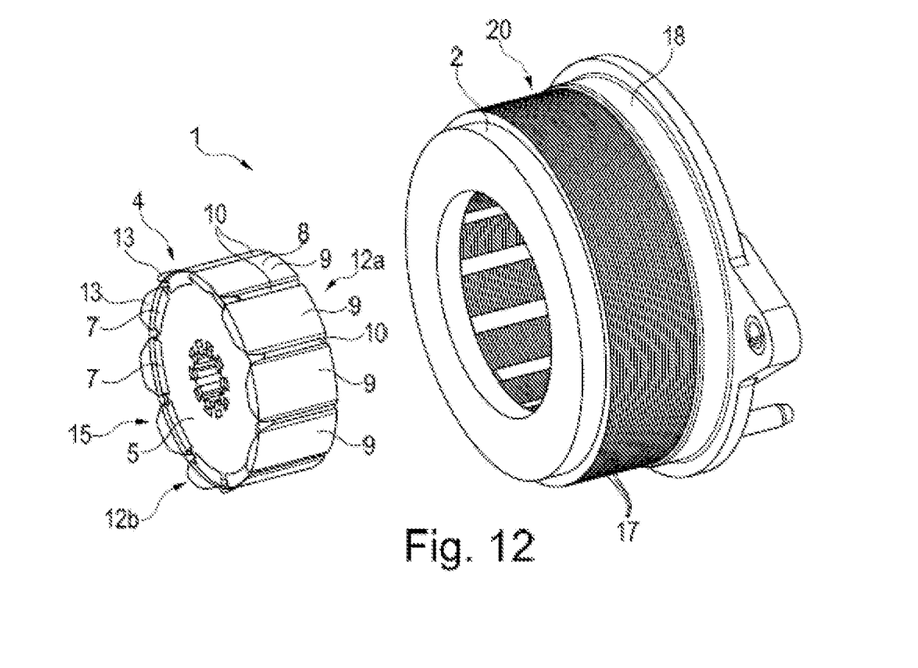
FIG. 12 shows a perspective view of the partially exploded electric motor, wherein the rotor and the stator are shown separately from each other.

Using FIGS. 1, 3 and 12, a basic structure of an electric motor 1 according to the disclosure can be easily recognized. The electric motor 1 is equipped with a stator 2 in an overall annular design. In this embodiment, the stator 2 has multiple stator laminations 17 arranged in a stack in the axial direction, i.e. along a rotational axis 3 of a rotor 4 of the electric motor 1. The stator laminations 17 are received on a stator housing/stator carrier 18. In a typical manner, windings 19 are further provided, which can be seen in a sectional view in FIG. 1 towards the axial end faces of the stack 20 on the stator laminations 17.

Furthermore, a rotatably mounted rotor 4 is arranged radially inside the stator 2 (in relation to the rotational axis 3). In this embodiment, the rotor 4 is thus implemented as an internal rotor. In further embodiments, however, it can, in principle, also be implemented as an external rotor.

In this embodiment, the rotor 4 has a single-piece main part 5. This main part 5 is also referred to as the rotor carrier. The main part 5 is preferably implemented as a sintered component. In further embodiments according to the disclosure, the main part 5 is alternatively provided in multiple parts with several rotor laminations (each preferably made of electrical sheet) arranged in stacks to form a lamination stack.

Several magnet elements 7, here in the form of permanent magnets, are arranged uniformly distributed in the circumferential direction on the main part 5. The circumferential direction is to be understood as a direction along an imaginary circular line running coaxially to the rotational axis 3. The magnet elements 7 are located on a radial side 6, in this case a radial outer side of the main part 5. In this context, reference is also made to FIGS. 8 to 13, which show the structure of the rotor 4 in more detail. The magnet elements 7, which are formed as circular arc segments when viewed in cross section, are supported directly on a radial outer surface 21 (outer shell surface) of the main part 5.

According to the disclosure, a burst-protection sleeve 8 is pressed onto/fixed via a press fit 16 onto the pre-assembly consisting of the main part 5 and magnet elements 7. The burst-protection sleeve 8 is pressed radially onto the magnet elements 7 from the outside while supporting the magnet elements 7 on the main part 5.

The burst-protection sleeve 8 is designed to be continuous in the circumferential direction, i.e. designed to be completely annular. The burst-protection sleeve 8 is provided, according to FIGS. 4 to 7, with several regions of different stiffness. For this purpose, the burst-protection sleeve 8 has multiple plate-shaped cover segments 9 arranged in a distributed manner in the circumferential direction and extending in the shape of a circular arc segment (following an outer surface of the magnet elements 7). Each cover segment 9 thus lies flat on a magnet element 7 from the radially outer side. Two cover segments 9, each arranged adjacent in the circumferential direction, are connected by a bridging region 10. In terms of its flexural strength, this bridging region 10 is deliberately reduced/decreased in the circumferential direction compared with the cover segments 9 by the design of its geometry.

Under closer inspection, each bridging region 10 shows a groove-shaped depression 11. The depression 11 runs in the axial direction of the burst-protection sleeve 8. In the exemplary embodiment shown, the depression 11 runs continuously along the entire (axial) length of the burst-protection sleeve 8. As can be seen clearly in FIG. 6, for example, the depression 11 is fully open towards a first axial end 12a of the burst-protection sleeve 8; the depression 11 is also open towards a second axial end 12b opposite the first axial end 12a. However, compared with the first end 12a, the depression 11 is only partially open due to a diameter change described in more detail below. This results in a geometry of the burst-protection sleeve 8 that can be expanded or compressed.

Figure 9:
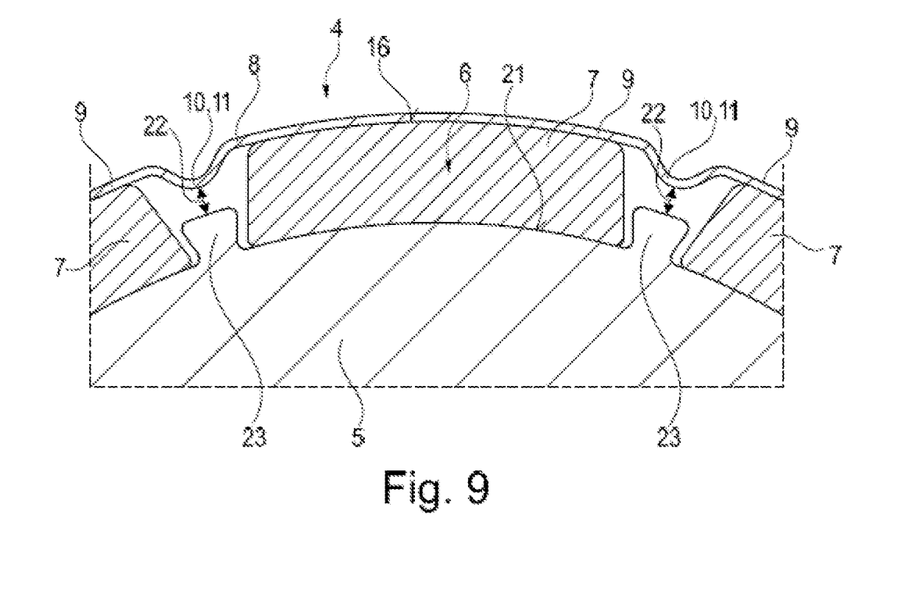
FIG. 9 shows a detailed view of the region marked "IX" in FIG. 8.

Each bridging region 10 forms a radial gap/distance 22 to a radial elevation 23 of the main part 5 (FIG. 9). The elevations 23 of the main part 5 serve to pre-position the magnet elements 7. The depressions 11 thus project into a circumferential intermediate space between two adjacent magnet elements 7 in the radial direction.

Figure 7:
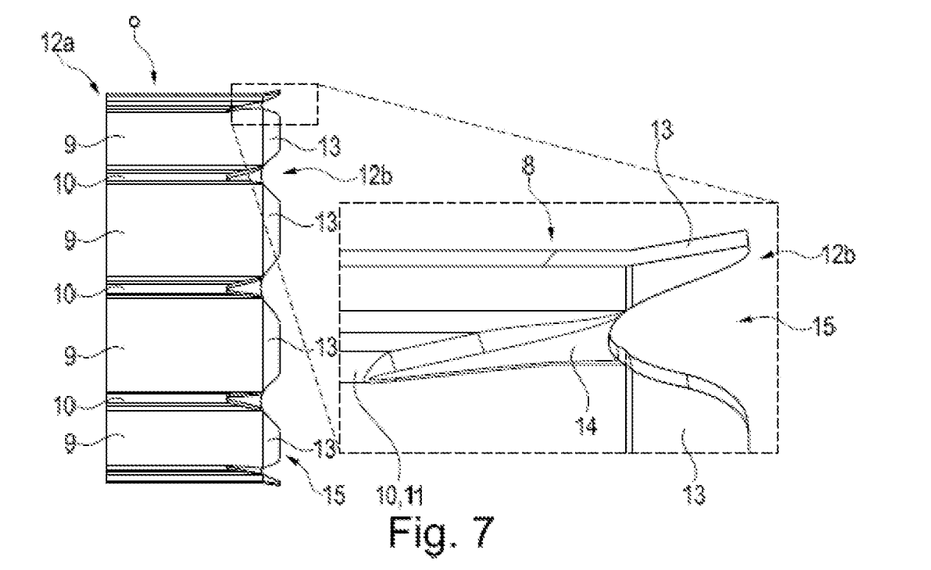
FIG. 7 shows two side views of the burst-protection sleeve, wherein a left-hand partial view shows the entire burst-protection sleeve and a right-hand partial view shows an angularly projecting extension of the annular rim, sleeve.

Furthermore, the burst-protection sleeve 8 is equipped with a type of insertion aid/assembly aid. For this purpose, the burst-protection sleeve 8 is implemented with a diameter change, in this case an increase in (inner) diameter, towards its second axial end 12b. As can be seen in FIG. 7, each cover segment 9 is adjoined by an axial extension 13 which extends in an axial direction obliquely to the cover segment 9. At the same time, the depression 11 is reduced in depth toward the second end 12b. Each depression 11/bridging region 10 consequently has a conically rising flank 14 towards the second end 12b (FIG. 7). The extensions 13 and the flanks 14 collectively form a conically expanding annular rim 15 at the second axial end 12b of the burst-protection sleeve 8, which implements the diameter change. This further facilitates axial pressing of the burst-protection sleeve 8 onto the pre-assembly consisting of the main part 5 and magnet element 7.

Figure 2:
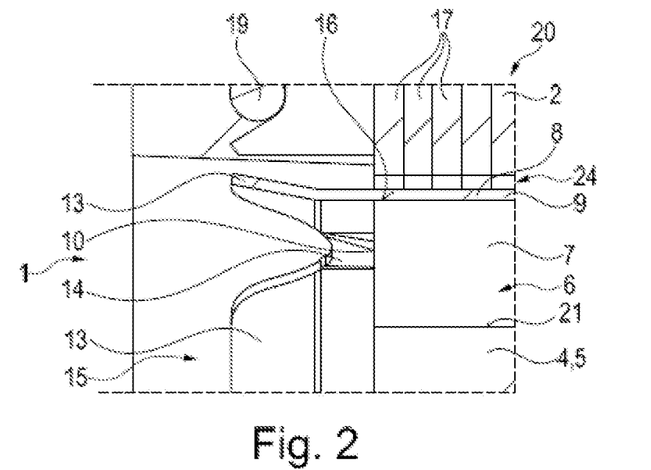
FIG. 2 shows a detailed view of the region marked "II" in FIG. 1 at an axial end of a burst-protection sleeve of a rotor.

With regard to the positioning of the rotor 4 relative to the stator 2, it can also be seen in FIG. 2 that the annular rim 15 is arranged axially offset from the magnet elements 7 and from the stator laminations 17, which minimizes the eddy current loss during operation of the electric motor 1 as far as possible. This results in an air gap 24 of constant thickness in the radial region between the stator laminations 17 and the outer circumferential side of the burst-protection sleeve 8.

The burst-protection sleeve 8 is preferably formed from a stainless steel.

Thus, an electric motor 1, preferably implemented as a brushless DC motor, is equipped with a rotor 4 which is preferably realized completely without bonding, i.e. in particular without bonding of the magnet elements 7.

In other words, according to the disclosure, a special relief geometry in the burst-protection sleeve 8 between the magnets 7 is used to locally reduce the stiffness at the circumference of the magnet 7 of this burst-protection sleeve 8 (in the tangential direction). Thus, lower forces are used for the assembly of the sleeve 8 with relatively high press-in forces on the rotor magnets 7 on the rotor carrier 5/rotor lamination stack via the press fit 16.

Figure 11:
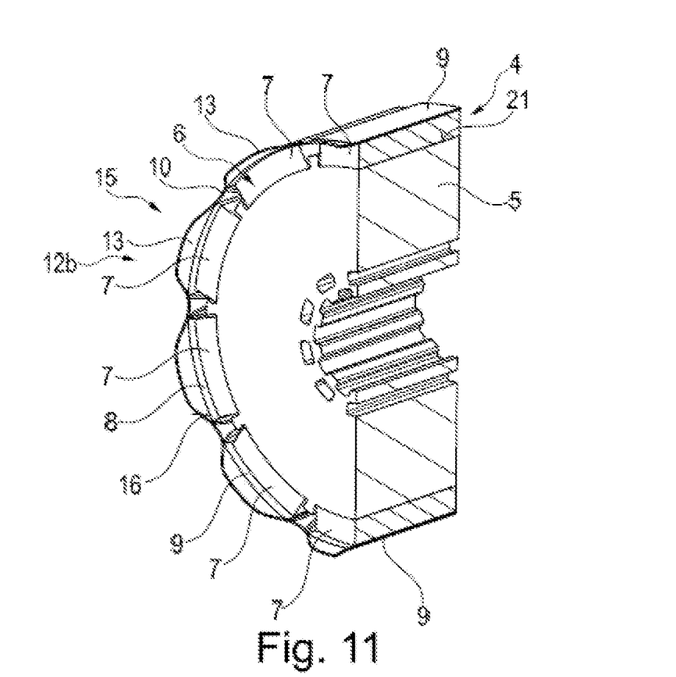
FIG. 11 shows a perspective view of the rotor shown in a longitudinal section.
Figure 13:
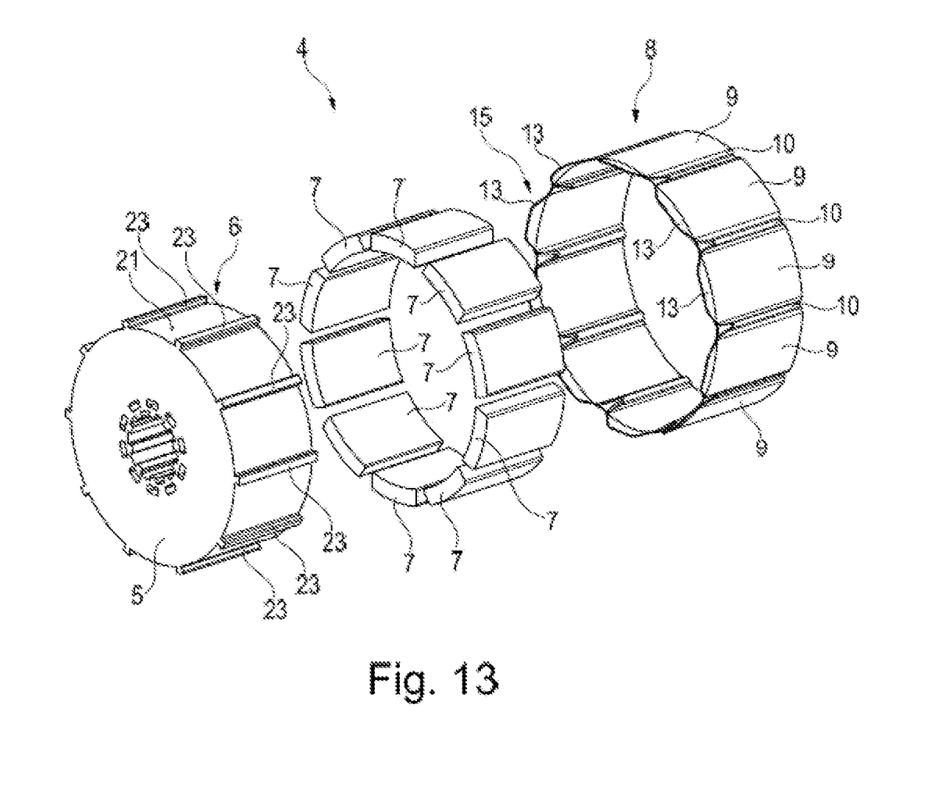
FIG. 13 shows an exploded view of the rotor.

FIGS. 11 to 13 are isometric views and sections of a BLDC rotor 4 with surface magnets 7 and a burst-protection sleeve 8 without bonding of the magnets 7 and a BLDC stator 2. The assembly of the rotor 4 consists of a rotor carrier 5, rotor magnets 7 and a burst-protection sleeve 8. The rotor carrier 5 is typically designed as a punch stack with several electrical sheets. Alternatively, the rotor carrier 5 is designed as a sintered component made of powder core material with low eddy current losses. If eddy current losses are not particularly pivotal to the design of the BLDC motor 1, the rotor carrier 5 can generally be made of a ferromagnetic material (e.g. steel). The rotor magnets 7 are typically designed as sintered NdFeB (rare earth materials) magnets. Alternatively, the magnets 7 are designed as sintered components made of hard ferrite. The burst-protection sleeve 8 is preferably made of stainless steel as a deep-drawn part.

A preferred assembly sequence of the BLDC rotor 4 is as follows: 1) Forming a punch stack (punching and stacking) to form the rotor carrier 5; 2) Attaching the rotor magnets 7 to the punch stack 5, wherein the magnets 7 are held by a device or the punch stack 5 is slightly magnetized so that the magnets 7 are attracted; 3) Attaching the burst-protection sleeve 8 to the subassembly consisting of rotor carrier 5 (punch stack) with the magnets 7; in this regard, the sleeve 8 is pushed on, wherein the rotor magnets 7 are axially supported in the assembly device.

Figure 8:
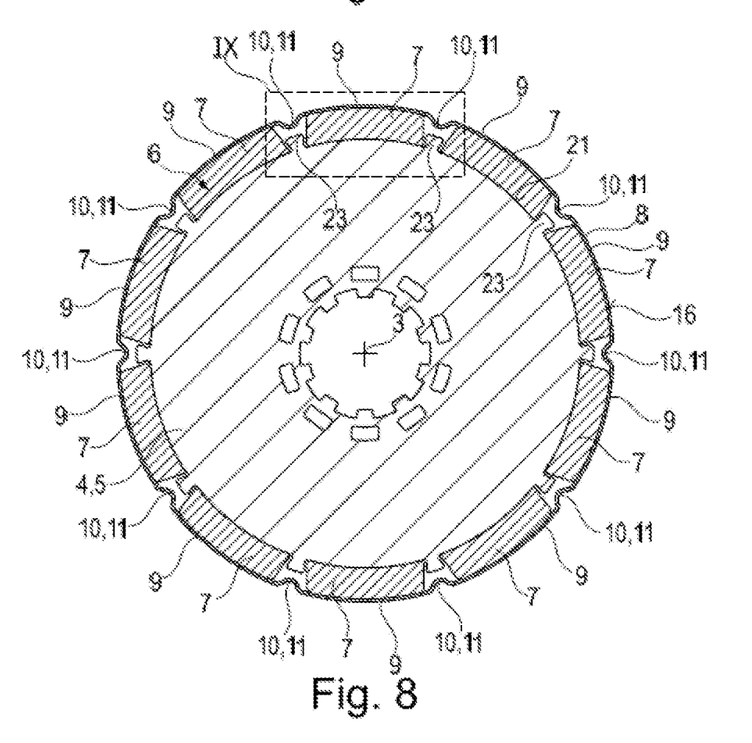
FIG. 8 shows a cross-sectional view of the rotor with the burst-protection
Figure 10:
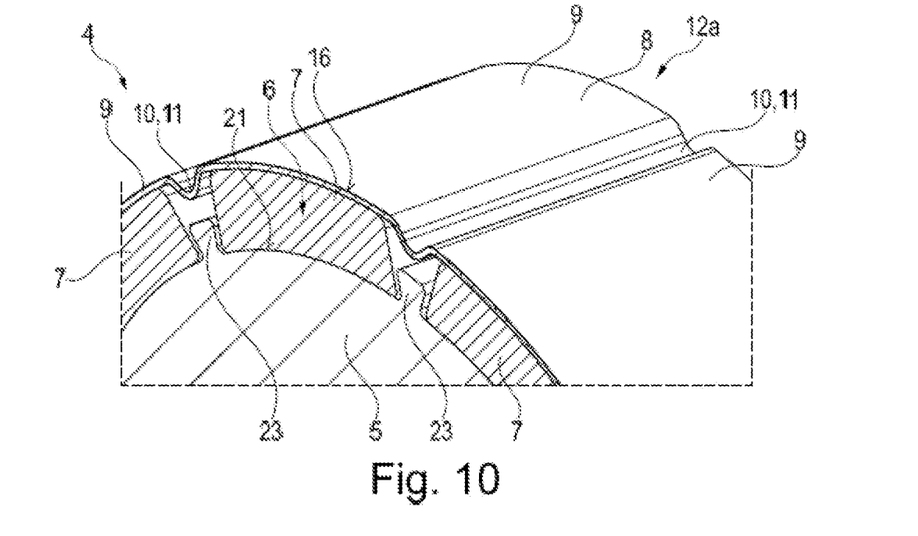
FIG. 10 shows a perspective view of the detail area shown in FIG. 9.

The FIGS. 8 to 10 are isometric views and sections of the described BLDC rotor 4. According to the disclosure, grooves 10, 11/local reliefs are arranged on the circumference of the burst-protection sleeve 8 and along the sleeve 8 in the axial direction between the rotor magnets 7. These geometries locally reduce the stiffness of the sleeve 8 and correspondingly the assembly forces. Thus, the burst-protection sleeve can be mounted as a press fit 16 on the subassembly consisting of the rotor carrier 5 (lamination stack) with the magnets 7 even at relatively low forces and/or at higher tolerances of the subassembly. In series production, it is common to have a press fit with an allowance of at least 0.2 mm to 0.3 mm or higher, while maintaining all tolerances. In such cases, there would be practically no possibility to realize this with a cylindrical steel sleeve (too high assembly forces, supercritical stresses in the sleeve 8/magnet 7 due to the mechanical load). The reliefs 10 in the sleeve geometry between the rotor magnets 7 allow for a local reduction of the stiffness in the tangential direction at the circumference of the sleeve 8. Thus, the assembly forces are relatively low and the mechanical stresses in the sleeve 8 and in the magnets 7 take on an acceptable level after assembly.

The burst-protection sleeve 8, which is pushed on as a press fit 16, presses the rotor magnets 7 onto the rotor carrier 5. Since the magnets 7 do not have to be bonded in this case, there is no need to provide a bonding gap between the ferromagnetic return of the magnetic circuit between rotor carrier 5 and rotor magnets 7. This offers advantages in terms of the magnetic resistance: The magnetic field closes in the region of the rotor carrier 5 with a higher efficiency. With the geometry of the reliefs 10, the sleeve thickness and the allowance of the press fit 16, the sleeve 8 can be dimensioned such that it fixes and secures the rotor magnets 7 over all critical thermal-mechanical, dynamic loads and vibration loads of the rotor 4 by the frictional connection (sleeve pressure radially inwards).

FIGS. 4 to 7 show isometric views and sections of the burst-protection sleeve 8. To facilitate the mounting of the burst-protection sleeve 8 on the subassembly of the rotor carrier 5 (rotor lamination stack) and magnets 7, an insertion area (annular rim 15) is provided, wherein magnets 7 are inserted into the sleeve 8 or the sleeve 8 is pushed onto magnets 7 when the press fit 16 is established. An advantage of this assembly aid geometry of the sleeve 8 is that in one of the two ends 12b of the sleeve 8, a conical transition with curves in the axial direction to the flat area of the sheet metal strip is created by the deep drawing process. This transition is usually cut off laterally further towards the flat area from the sheet metal strip in the punching and deep-drawing tool. In this case, this transition, which should normally be cut off in the case of cylindrical deep-drawn parts, is used as an insertion area for assembly.

The FIGS. 1 to 3 show further isometric views and sections of the assembly consisting of the stator 2 and rotor 4. The stator 2 usually consists of a stator lamination stack 20, pole shoe isolation parts, windings 19 including circuitry and contacting interface, and an overmolding 26 of the stator 2 (often present to protect the windings 19 and electrical contacting because it is arranged in a space flooded with medium, for example, in pump applications of the BLDC-E motor 1).

The insertion area 15 for mounting the burst-protection sleeve 8 (FIGS. 1 to 3) is axially arranged in a space between the rotor 4 and the stator 2 of the BLDC motor 1, in which the geometry does not cause any negative influence on the mechanical air gap 24 between the stator 2 and the rotor 4. The mechanical air gap 24 between the stator 2 and the rotor 4 of the motor 1 should be kept as small as possible for better efficiency of the electric motor 1.

LIST OF REFERENCE SYMBOLS

1 Electric motor
2 Stator
3 Rotational axis
4 Rotor
5 Main part
6 Side
7 Magnet element
8 Burst-protection sleeve
9 Cover segment
10 Bridging region
11 Depression
12a First end
12b Second end
13 Extension
14 Flank
15 Annular rim
16 Press fit
17 Stator lamination
18 Stator carrier
19 Winding
20 Stack 21 Outer surface
22 Distance
23 Elevation
24 Air gap
25 Pole shoe isolation parts
26 Overmolding

The invention claimed is:

1. An electric motor comprising:

a stator; and a rotor rotatably mounted about a rotational axis relative to the stator, wherein the rotor has a main part, multiple magnet elements which are distributed along a circumferential direction and are received on a radial face of the main part in a mutually spaced manner, and a burst-protection sleeve which covers the main part and the magnet elements and wherein the burst-protection sleeve has multiple cover segments, each of which directly contacts a magnet element, and multiple bridging regions which connect two adjacent cover segments together, wherein the burst-protection sleeve is configured to directly support the magnet elements relative to the main part, wherein the bridging regions have a lower degree of flexural strength in the circumferential direction than the cover segments, wherein at a second axial end of the burst-protection sleeve each cover segment has an extension projecting in an axial direction, wherein the extension has a tapered end, wherein each bridging region is provided with a rising flank towards the second axial end of the burst-protection sleeve, wherein the rising flank is axially offset from the extension and extends radially up to the cover segments at an axial position at which the extension projects in the axial direction from the cover segments.

2. The electric motor according to claim 1, wherein the burst-protection sleeve is fixed on the magnet elements attached to the main part by a press fit.

3. The electric motor according to claim 1, wherein each bridging region has a groove-shaped depression.

4. The electric motor according to claim 1, wherein each bridging region is open towards a first axial end of the burst-protection sleeve.

5. The electric motor according to claim 1, wherein the burst-protection sleeve has a diameter change at the second axial end.

6. The electric motor according to claim 5, wherein the extension and the rising flank collectively form a conically expanding annular rim forming the diameter change, wherein the extension and a portion of the rising flank are arranged axially offset from the magnet elements when directly supporting to the magnet elements.

7. The electric motor according to claim 5, wherein the diameter change is formed by a conically widening or tapering annular rim.

8. The electric motor according to claim 1, wherein the rotor is arranged relative to the stator in such a way that the extensions are arranged axially adjacent to the magnet elements.

9. The electric motor according to claim 1, wherein the electric motor is designed as a brushless dc motor.

* * * * *